C. F. ECKART.
MULSH.
APPLICATION FILED SEPT. 23, 1919.

1,372,996.

Patented Mar. 29, 1921.

INVENTOR.
Chas. F. Eckart,
BY Chas. J. O'Neill.
ATTORNEY.

UNITED STATES PATENT OFFICE.

CHARLES FRANKLIN ECKART, OF OLAA, TERRITORY OF HAWAII.

MULSH.

1,372,996.

Specification of Letters Patent.

Patented Mar. 29, 1921.

Application filed September 23, 1919. Serial No. 325,723.

*To all whom it may concern:*

Be it known that I, CHARLES F. ECKART, a citizen of the United States, residing at Olaa, in the county of Hawaii and Territory of Hawaii, have invented certain new and useful Improvements in Mulshes; and I do hereby declare the following to be a full, clear, and exact description of the invention, such as will enable others skilled in the art to which it appertains to make and use the same.

In my co-pending application, Serial No. 325,721, filed September 23, 1919, I have described the method of enhancing the growth of plants, which consists broadly in placing the soil of the proposed rows of plants in proper tilth, supplying the same with moisture, superimposing a dark, opaque, waterproof mulsh over the proposed rows until such a period has elapsed as will insure the germination of the weed seeds and the extermination of the resulting weeds and in producing planting openings in said mulsh after the weeds have been exterminated, through which openings the plant seeds or stock are set in the ground. In the above referred to application I have described the advantage of making planting openings of variable sizes, so that the access of the sun and wind to the planting openings and the evaporation of the water from the soil can be controlled. For instance, in the wet season it is desirable to have more of the water evaporate from the soil than in the dry season, for otherwise, the soil would become water-soaked. Therefore, in the wet season it is desirable to produce larger openings than in the dry season. Furthermore, some plants require more moisture than others, and for this reason the evaporation of the moisture must be either retarded or enhanced.

The present invention has for its object to produce a mulsh in which the planting openings may be formed of any desired size, within limits, and in which the sizes of the openings may be made uniform without requiring any particular skill in the operator.

Figure 1:
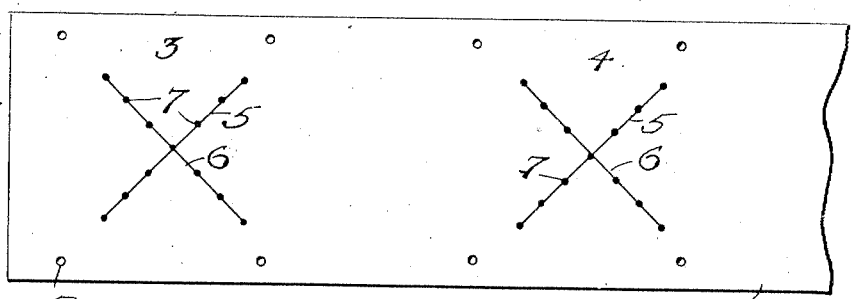
Figure 1 is a plan view of a portion of a mulsh showing the markings thereon, before the planting openings have been produced.
Figure 2:
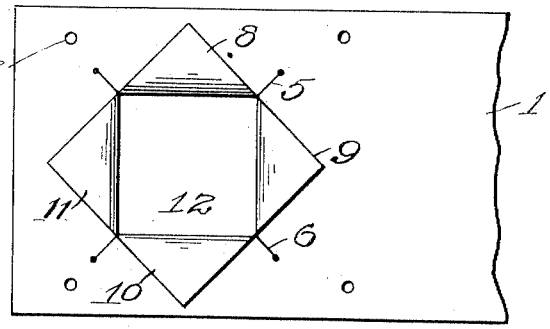
Fig. 2 is a fragmental view after one of the planting openings has been formed.

Referring to Figs. 1 and 2 of the drawing, the mulsh is illustrated as in the form of a strip but, of course, it may be of any desired form and may be provided with any number of planting openings and markings. This strip may, if desired, be provided with pegging centers 2 through which pegs may be inserted to attach the strip to the ground, or these pegging centers may be dispensed with and the strip held in place on the ground by superimposed stones or earth thereon. Arranged longitudinally of the strip 1 are systematically arranged markings, indicated generally by the reference characters 3 and 4. These markings consist of intersecting lines 5 and 6, which as illustrated form the diagonals of rectangles, but which, as a matter of fact may form diagonals of any quadrilateral if it is found desirable to make the planting opening other than of rectangular form. Measuring points 7 are arranged on the lines 5 and 6 and are uniformly spaced, as indicated in Fig. 1 of the drawing. These markings formed by the lines 5 and 6 and the measuring points 7 may be produced on the strip 1 when the latter is manufactured, by either printing, indentation or in any other suitable manner. When it is desired to form a planting opening the operator will make an incision along the line 5, which incision will extend to both sides of the line 6 to the same degree. For instance, if it is desired to form a small planting opening, the incision may extend to the first measuring point 7 on each side of the line 6, or if it is desired to form a larger opening the incision may extend to the second or to the last measuring point. A second incision is then made along the line 6, which incision extends an equal distance to the opposite sides of the line 5 and to an extent equal to that of the incision along the line 5. After these incisions have been made the flaps 8, 9, 10 and 11 produced thereby are bent back to overlie the strip 1 and as described in the above-referred to application, these flaps may be bent back to any desired degree. The first planting opening having been formed in the strip, the operations are followed out in connection with the subsequent markings, so that the openings will be uniform in size. The provision of the markings along the lines 5 and 6 insures the uniformity in the size of the openings and makes it unnecessary to employ skilled labor, in view of the fact that unskilled labor, guided by the markings can successfully produce the planting openings of uniform size. In Fig. 2 of the drawing I have illustrated a planting opening 12 which is formed by the bending back of the flaps 8—11, which flaps are formed by incisions made along the lines 5 and 6, but not extending to the ends of the lines. It is obvious that the larger opening may be produced if the incisions had been carried to the ends of the lines, and conversely, the smaller openings would have been produced if the incisions had been carried only to the first series of measuring points, rather than to the second series. The intersecting lines 5 and 6 and the measuring points 7 thereon, form in effect graduated planting opening indications, so that openings of any desired size may be formed.

Figure 3:
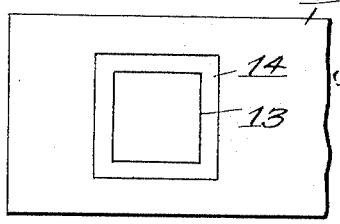
Fig. 3 is a fragmental view showing a modified system of marking.
Figure 4:
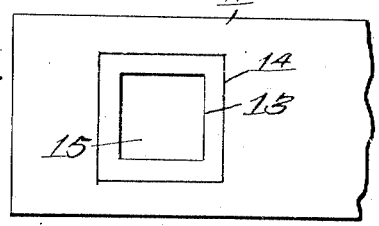
Fig. 4 is a similar view where the innermost marking has been followed to produce a planting opening.

In Figs. 3 and 4 of the drawing I have illustrated a modification of the markings where the graduated planting opening indications are formed by a series of rectangular lines 13 and 14, only two of such lines being illustrated in the drawing. It, however, will be realized that the number of lines may be increased as desired. In Fig. 4 of the drawing an incision has been made along the inner rectangular line 13 to form the planting opening 15.

Figure 5:
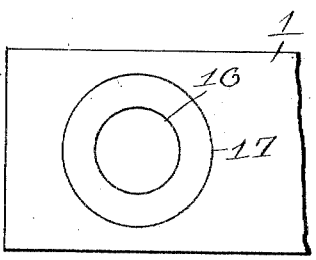
Fig. 5 is a fragmental view showing a further modification of the opening.
Figure 6:
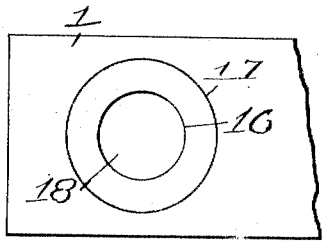
Fig. 6 is a similar view where the innermost marking has been followed to produce a circular planting opening.

In Figs. 5 and 6 of the drawing circular lines 16 and 17 are illustrated and in Fig. 6 the incision has been made along the inner line 16 to produce the circular planting opening 18.

It will be realized that no matter whether the markings indicated in Figs. 1 and 2 or those indicated in Figs. 3 and 5 are followed, the size of the openings may be made uniform. Thus it will be possible to first determine the size desired and to instruct an unskilled laborer as to the size, whereupon he may carry out the production of the openings of a uniform size successfully.

In using the mulsh illustrated, the same is placed upon the ground in surface contact therewith, after the ground has been placed in proper tilth and watered and the strip is then secured to the ground in the desired manner. It is permitted to remain upon the ground until the weeds are exterminated, whereupon the incisions are made and the planting openings produced. Thereafter the plant seeds or other plant stock may be set in the planting openings, the size of which have been calculated to produce the best results. The strip is permitted to remain upon the ground during the growth of the plants and thus the benefits rising from the presence of the mulsh will inure to the benefit of the plants.

The mulsh, as hereinbefore described, is of the same general character as that set forth in my companion application, Serial No. 325,721, method of enhancing the growth of plants, and when applied to its intended purpose will be effective in carrying out the method described and claimed in said copending application and will, therefore, produce the same result as attained by the method aforesaid, namely, the enhancement of the growth of the plants and a material increase in the yield, by reason of the facts that it will destroy the weeds in the planting area, regulate the moisture content of the soil to the best advantage, and absorb solar heat and transmit the same to the soil, thereby producing the most favorable condition for the optimum development of the plants.

What I claim is:

1. A mulsh consisting of a strip of opaque heat absorbing material having a series of planting opening indications thereon to define and facilitate the production of systematically spaced planting openings.

2. A mulsh consisting of a strip of opaque heat absorbing material having a series of planting opening indications thereon to define and facilitate the production of systematically spaced planting openings of uniform size.

3. A mulsh consisting of a strip of material having a series of graduated planting opening indications thereon to facilitate the production of planting openings.

4. A mulsh consisting of a strip of material having a series of systematically spaced graduated planting opening indications to facilitate the production of planting openings of uniform size.

In testimony whereof I affix my signature.

CHARLES FRANKLIN ECKART.